(12) United States Patent
Carlsson

(10) Patent No.: US 8,529,815 B2
(45) Date of Patent: Sep. 10, 2013

(54) POLYOLEFIN COMPOSITION COMPRISING CROSSLINKABLE POLYOLEFIN WITH SILANE GROUPS, SILANOL CONDENSATION CATALYST AND SILICON CONTAINING COMPOUND

(75) Inventor: Roger Carlsson, Säve (SE)

(73) Assignee: Borealis Technology Oy, Porvoo (FI)

( * ) Notice: Subject to any disclaimer, the term of this patent is extended or adjusted under 35 U.S.C. 154(b) by 224 days.

(21) Appl. No.: 12/745,612

(22) PCT Filed: Dec. 2, 2008

(86) PCT No.: PCT/EP2008/010203
§ 371 (c)(1),
(2), (4) Date: Jul. 12, 2010

(87) PCT Pub. No.: WO2009/071265
PCT Pub. Date: Jun. 11, 2009

(65) Prior Publication Data
US 2010/0311911 A1 Dec. 9, 2010
US 2012/0041151 A9 Feb. 16, 2012
US 2013/0066017 A9 Mar. 14, 2013

(30) Foreign Application Priority Data
Dec. 3, 2007 (EP) ...................................... 07023382

(51) Int. Cl.
B29C 47/00 (2006.01)
C08G 77/60 (2006.01)
C08F 30/08 (2006.01)

(52) U.S. Cl.
USPC .......... 264/211; 264/176.1; 525/477; 528/34; 528/35

(58) Field of Classification Search
None
See application file for complete search history.

(56) References Cited

U.S. PATENT DOCUMENTS

| | | | |
|---|---|---|---|
| 3,646,155 A | 2/1972 | Scott | |
| 4,117,195 A | 9/1978 | Swarbrick et al. | |
| 4,297,310 A | 10/1981 | Akutsu et al. | |
| 4,351,876 A | 9/1982 | Doi et al. | |
| 4,397,981 A | 8/1983 | Doi et al. | |
| 4,413,066 A | 11/1983 | Isaka et al. | |
| 4,446,283 A | 5/1984 | Doi et al. | |
| 4,456,704 A | 6/1984 | Fukumura et al. | |
| 4,689,369 A | 8/1987 | Ishino et al. | |
| 7,153,923 B2 * | 12/2006 | Schindler et al. | 528/35 |
| 7,368,519 B2 * | 5/2008 | Chu | 528/34 |
| 2004/0265524 A1 * | 12/2004 | Wideman et al. | 428/35.7 |

FOREIGN PATENT DOCUMENTS

| | | |
|---|---|---|
| EP | 1 254 193 | 5/2004 |
| EP | 1 309 631 | 4/2005 |
| EP | 1 309 632 | 4/2005 |
| EP | 1 862 492 | 12/2007 |
| GB | 2 191 891 | 1/1988 |
| WO | WO 92/21721 | 12/1992 |
| WO | WO 95/17463 | 6/1995 |
| WO | WO 00/36612 * | 6/2000 |
| WO | WO 2005/003199 | 1/2005 |

OTHER PUBLICATIONS

International Search Report mailed Jul. 30, 2009 for International application No. PCT/EP2008/010203.
Written Opinion of the International Searching Authority mailed Jul. 30, 2009 for International application No. PCT/EP2008/010203.

* cited by examiner

*Primary Examiner* — Marc Zimmer
(74) *Attorney, Agent, or Firm* — Fay Sharpe LLP

(57) ABSTRACT

The present invention relates to a composition comprising (i) a crosslinkable polyolefin with hydrolysable silane groups (A), (ii) a silanol condensation catalyst (B) of the formula $Ar(SO_3H)_x$ as defined herein, and (iii) a silicon containing compound (C) selected from the group consisting of 3-ureidopropyltrimethoxysilane, N-trimethoxysilylmethyl-O-methylcarbamate, and mixtures thereof; to an article, in particular a wire or cable, comprising such a composition, and to the use of such a composition for producing the article. The present invention further relates to the use of silicon containing compound (C) as a processing aid in the compounding of polyolefin compositions and as a surface smoothening agent in polyolefin compositions. Finally, the present invention relates to the use of a silicon containing compound (C) as a drying agent for polyolefin compositions, as a corrosion inhibitor in polyolefin compositions comprising a Bronsted acid and as a pH controlling agent in polymer compositions comprising a Bronsted acid.

3 Claims, No Drawings

POLYOLEFIN COMPOSITION COMPRISING CROSSLINKABLE POLYOLEFIN WITH SILANE GROUPS, SILANOL CONDENSATION CATALYST AND SILICON CONTAINING COMPOUND

The present invention relates to a polyolefin composition comprising a crosslinkable polyolefin with hydrolysable silane groups, a silanol condensation catalyst, and a silicon containing compound, to an article, in particular a wire or cable, comprising such a composition, and to the use of such a composition for the production of an article.

The present invention also relates to the use of a silicon containing compound as a processing aid in the compounding of polyolefin compositions and to the use as a surface smoothening agent in polyolefin compositions.

The present invention further relates to the use of a silicon containing compound as a drying agent for polyolefin compositions, as a corrosion inhibitor in polyolefin compositions comprising a Brönsted acid and as a pH controlling agent in polymer compositions comprising a Brönsted acid.

It is known to cross-link polyolefins by means of additives as this improves the properties of the polyolefin such as mechanical strength and chemical heat resistance. Cross-linking may be performed by condensation of silanol groups contained in the polyolefin which can be obtained by hydrolysation of silane groups. A silane compound can be introduced as a cross-linkable group e.g. by grafting the silane compound onto a polyolefin, or by copolymerisation of olefin monomers and silane group containing monomers. Such techniques are known e.g. from U.S. Pat. No. 4,413,066, U.S. Pat. No. 4,297,310, U.S. Pat. No. 4,351,876, U.S. Pat. No. 4,397,981, U.S. Pat. No. 4,446,283 and U.S. Pat. No. 4,456,704.

For cross-linking of such polyolefins, a silanol condensation catalyst must be used. Conventional catalysts are for example tin-organic compounds such as dibutyl tin dilaurate (DBTDL). It is further known that the cross-linking process advantageously is carried out in the presence of acidic silanol condensation catalysts. In contrast to the conventional tin-organic catalysts the acidic catalysts allow cross-linking to quickly take place already at room temperature. Such acidic silanol condensation catalysts are disclosed for example in WO 95/17463. The content of this document is enclosed herein by reference.

In order to obtain a homogeneous end-product, it is important that a very good mixing of the components of the polyolefin composition is obtained, including a very good dispersion of the silanol condensation catalyst in the polymer matrix. Furthermore, also a high throughput in the processing step, e.g. a high output of an extruder in which the composition is extruded, is desired.

When compounding the polyolefin composition e.g. by extrusion, it is known that mixing, and hence dispersion of the silanol condensation catalyst, can be improved by higher energy input into the extruder. Of course, also a higher output of the extruder requires higher energy input into the extruder. However, due to an increase of temperature of the polyolefin composition created by friction the amount of energy input and hence the output of the extruder is limited, because usually the polyolefin composition starts degrading at a temperature of about 200° C. It would thus be desirable to have a polyolefin composition allowing for higher energy input into an extruder and hence higher output of the extruder, at lower temperatures thus avoiding degradation of the polyolefin.

Furthermore, in order to avoid degradation of the polyolefin as far as possible and to maximise extruder output, it is also desirable that the composition remains in the extruder as short as possible, i.e. it is desirably to decrease the retention time in the extruder.

Finally, for many applications, such as semiconductive layers in medium or high voltage cables, a high surface quality, including surface smoothness, of the extruded polyolefin composition is required.

It is hence an object of the present invention to provide a polyolefin composition comprising a polyolefin with hydrolysable silane groups and a silanol condensation catalyst, with improved processing properties, in particular with lower extrusion temperature and higher throughput upon extrusion, decreased retention time in the extruder, and with improved surface quality after extrusion.

It has now surprisingly been found that the above objects can be achieved by addition of a silicon containing compound to a composition comprising a polyolefin with hydrolysable silane groups and a silanol condensation catalyst.

The present invention in a first aspect therefore provides a polyolefin composition comprising
(i) a crosslinkable polyolefin with hydrolysable silane groups (A),
(ii) a silanol condensation catalyst (B), and
(iii) a silicon containing compound (C) according to the formula

wherein
$R^1$, which may be the same or different if more than one such group is present, is a monofunctional, or, if m=2, is a bifunctional, hydrocarbyl residue comprising from 1 to 100 carbon atoms and at least one heteroatom;
$R^2$, which may be the same or different if more than one such group is present, is a hydrocarbyloxy residue comprising from 1 to 100 carbon atoms;
$R^3$, is $—R^4SiR^1_p R^2_q$, wherein
p is 0 to 3,
q is 0 to 3,
with the proviso that p+q is 3, and
$R^4$ is $—(CH_2)_r Y_s (CH_2)_t—$ where r and t independently are 1 to 3, s is 0 or 1 and Y is a difunctional heteroatomic group selected from —O—, —O—(CO)—, —NH—, —NH$_2$, —NH—(CO)—NH$_2$, —NH—(CO)—OCH$_3$, an epoxy group, a carbamate group, —S—, —SO—, —SO$_2$—, —NR—, —PR—, where R is a hydrocarbon or a hydrogen and where $R^1$ and $R^2$ are as previously defined; and
x is 0 to 3, y is 1 to 4, z is 0 or 1, with the proviso that x+y+z=4;
and m=1 or 2.

The composition according to the invention has an improved processing behaviour because it enables extrusion of the composition at significantly decreased temperature and, at the same time, with very good dispersion and high output. Thus, much longer production campaigns are possible with the present composition.

Furthermore, the composition in the extruder behaves very similar to an thermoplastic material upon extrusion, i.e. there is virtually no drop in melt flow rate upon extrusion, and the retention time in the extruder is significantly decreased, thus proving again the excellent processing properties of the composition.

Still further, the composition after extrusion has a very good surface quality, e.g. surface smoothness and low gels content. In particular, the high surface quality is obtained also immediately upon extrusion of new material of the composition, after the extruder has been stopped for a certain time, e.g. for tool change.

Preferably, the silicon containing compound (C) has a high compatibility with the polymer composition of the invention which means that even after treatment of the composition at elevated temperature for several hours the major part of the silicon containing compound (C) does not volatise from the composition. The compatibility of compound (C) can be adjusted by appropriate selection of, especially, group $R^1$, which should be chosen sufficiently large and non-polar.

More particularly, the silicon containing compound (C), preferably, is compatible with the composition insofar as it, when having been present in the composition in an initial amount corresponding to 0.060 mole hydrolysable groups per 1000 g composition, after a storage at 60° C. for 74 h in air is still present in the composition at least in an amount corresponding to 0.035 mole hydrolysable groups per 1000 g composition.

Furthermore, preferably, in formula (I) for compound (C):
$R^1$, which may be the same or different if more than one such group is present, contains 1 to 30 carbon atoms, with the proviso that if more than one $R^1$ group is present the total number of carbon atoms of the $R^1$ groups is at most 60, and further comprises at least one heteroatom selected from oxygen, nitrogen, sulphur, phosphorus and combinations thereof;

Furthermore, preferably in formula (I) for compound (C):
$R^2$, which may be the same or different if more than one such group is present, is an alkoxy, aryloxy, alkylaryloxy, or arylalkyloxy group containing 1 to 15 carbon atoms, with the proviso that if more than one $R^2$ group is present the total number of carbon atoms in the alkyl moieties of the $R^2$ groups is at most 40, more preferably:
$R^2$, which may be the same or different if more than one such group is present, is a linear or branched $C_1$- to $C_{10}$-alkoxy, still more preferably is a $C_1$- to $C_8$-alkoxy, still more preferably is a $C_1$- to $C_4$-alkoxy, and most preferably is a methoxy, ethoxy, propoxy, or 1-butoxy group.

Furthermore, preferably, in formula (I) for compound (C):
R is a hydrogen or a hydrocarbon with 1 to 100 carbon atoms, still more preferably with 1 to 50 carbon atoms, and most preferred with 1 to 25 carbon atoms.

The alkyl moieties of $R^1$, $R^2$ and R may be linear or branched.

In a particularly preferred embodiment $R^1$ comprises at least one heteroatom or heteroatomic group selected from —O—, —O—(CO)—, —NH—, —NH$_2$, —NH—(CO)—NH$_2$, —NH—(CO)—OCH$_3$, an epoxy group, a carbamate group, —S—, —SO—, —SO$_2$—, —NR—, —PR—, where R is as previously defined.

Preferably, in formula (I) for compound (C) x=1.
Furthermore, preferably in formula (I) y=3.
Still further, preferably in formula (I) z=0.
Finally, preferably in formula (I) m=1.

Preferred compounds (C) are also all those compounds which are combinations of any of the above-mentioned preferred embodiments for any of the parameters of formula (I).

In a still more preferred embodiment, compound (C) comprises, more preferably is selected from the group of Methacryloxymethyltrimethoxysilane, 3-Methacryloxypropyltrimethoxysilane, 3-Glycidoxypropyltrimethoxysilane, 3-Ureidopropyltrimethoxysilane, and N-Trimethoxysilylmethyl-O-methylcarbamate.

The polyolefin composition of the invention preferably comprises compound (C) in an amount of from 0.001 to 3 wt % of the total composition, more preferably in an amount of from 0.01 to 2.5 wt % of the total composition.

Preferably, the silanol condensation catalysts (B) of the polyolefin composition is an acidic compound, still preferably a Brönsted acid, i.e. is a substance which acts as a proton donor.

Such Brönsted acids may comprise inorganic acids such as sulphuric acid and hydrochloric acid, and organic acids such as citric acid, stearic acid, acetic acid, sulphonic acid and alkanoic acids as dodecanoic acid, or a precursor of any of the compounds mentioned.

Preferably, the Brönsted acid is a sulphonic acid, more preferably an organic sulphonic acid.

Still more preferably, the Brönsted acid is an organic sulphonic acid comprising 10 C-atoms or more, more preferably 12 C-atoms or more, and most preferably 14 C-atoms or more, the sulphonic acid further comprising at least one aromatic group which may e.g. be a benzene, naphthalene, phenantrene or anthracene group. In the organic sulphonic acid, one, two or more sulphonic acid groups may be present, and the sulphonic acid group(s) may either be attached to a non-aromatic, or preferably to an aromatic group, of the organic sulphonic acid.

Further preferred, the aromatic organic sulphonic acid comprises the structural element:

$$Ar(SO_3H)_x \qquad (II)$$

with Ar being an aryl group which may be substituted or non-substituted, and x being at least 1.

The organic aromatic sulphonic acid silanol condensation catalyst may comprise the structural unit according to formula (II) one or several times, e.g. two or three times. For example, two structural units according to formula (II) may be linked to each other via a bridging group such as an alkylene group.

Preferably, Ar is an aryl group which is substituted with at least one $C_4$- to $C_{30}$-hydrocarbyl group, more preferably $C_4$- to $C_{30}$-alkyl group.

Aryl group Ar preferably is a phenyl group, a naphthalene group or an aromatic group comprising three fused rings such as phenantrene and anthracene.

Preferably, in formula (II) x is 1, 2 or 3, and more preferably x is 1 or 2.

Furthermore, preferably the compound used as organic aromatic sulphonic acid silanol condensation catalyst has from 10 to 200 C-atoms, more preferably from 14 to 100 C-atoms.

In one preferred embodiment, Ar is a hydrocarbyl substituted aryl group and the total compound containing 14 to 28 carbon atoms, and still further preferred, the Ar group is a hydrocarbyl substituted benzene or naphthalene ring, the hydrocarbyl radical or radicals containing 8 to 20 carbon atoms in the benzene case and 4 to 18 atoms in the naphthalene case.

It is further preferred that the hydrocarbyl radical is an alkyl substituent having 10 to 18 carbon atoms and still more preferred that the alkyl substituent contains 12 carbon atoms and is selected from dodecyl and tetrapropyl. Due to commercial availability it is most preferred that the aryl group is a benzene substituted group with an alkyl substituent containing 12 carbon atoms.

The currently most preferred compounds are dodecyl benzene sulphonic acid and tetrapropyl benzene sulphonic acid.

The silanol condensation catalyst may also be precursor of the sulphonic acid compound, including all its preferred embodiments mentioned, i.e. a compound that is converted by hydrolysis to such a compound. Such a precursor is for example the acid anhydride of a sulphonic acid compound, or a sulphonic acid that has been provided with a hydrolysable protective group, as e.g. an acetyl group, which can be removed by hydrolysis.

In a second preferred embodiment, the sulphonic acid catalyst is selected from those as described in EP 1 309 631 and EP 1 309 632, namely a) a compound selected from the group of
(i) an alkylated naphthalene monosulfonic acid substituted with 1 to 4 alkyl groups wherein each alkyl group is a linear or branched alkyl with 5 to 40 carbons with each alkyl group being the same or different and wherein the total number of carbons in the alkyl groups is in the range of 20 to 80 carbons;
(ii) an arylalkyl sulfonic acid wherein the aryl is phenyl or naphthyl and is substituted with 1 to 4 alkyl groups wherein each alkyl group is a linear or branched alkyl with 5 to 40 carbons with each alkyl group being the same or different and wherein the total number of carbons in the alkyl groups is in the range of 12 to 80;
(iii) a derivative of (i) or (ii) selected from the group consisting of an anhydride, an ester, an acetylate, an epoxy blocked ester and an amine salt thereof which is hydrolysable to the corresponding alkyl naphthalene monosulfonic acid or the arylalkyl sulfonic acid;
(iv) a metal salt of (i) or (ii) wherein the metal ion is selected from the group consisting of copper, aluminium, tin and zinc; and
b) a compound selected from the group of
(i) an alkylated aryl disulfonic acid selected from the group consisting of the structure (III):

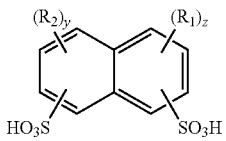

and the structure (IV):

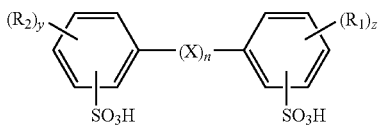

wherein each of $R_1$ and $R_2$ is the same or different and is a linear or branched alkyl group with 6 to 16 carbons, y is 0 to 3, z is 0 to 3 with the proviso that y+z is 1 to 4, n is 0 to 3, X is a divalent moiety selected from the group consisting of —C($R_3$)($R_4$)—, wherein each of $R_3$ and $R_4$ is H or independently a linear or branched alkyl group of 1 to 4 carbons and n is 1; —C(=O)—, wherein n is 1; —S—, wherein n is 1 to 3 and —S(O)$_2$—, wherein n is 1; and
(ii) a derivative of (i) selected from the group consisting of the anhydrides, esters, epoxy blocked sulfonic acid esters, acetylates, and amine salts thereof which is a hydrolysable to the alkylated aryl disulfonic acid,
together with all preferred embodiments of those sulphonic acids as described in the mentioned European Patents.

Preferably, in the polyolefin composition according to the invention the silanol condensation catalyst is present in an amount of 0.0001 to 6 wt %, more preferably of 0.001 to 2 wt %, and most preferably 0.02 to 0.5 wt %.

The composition of the present invention comprises a cross-linkable polyolefin containing hydrolysable silane groups (A). More preferably the cross-linkable polyolefin comprises, still more preferably consists of, a polyethylene containing hydrolysable silane groups.

The hydrolysable silane groups may be introduced into the polyolefin by copolymerisation of e.g. ethylene monomers with silane group containing comonomers or by grafting, i.e. by chemical modification of the polymer by addition of silane groups mostly in a radical reaction. Both techniques are well known in the art.

Preferably, the silane group containing polyolefin has been obtained by copolymerisation. In the case of polyolefins, preferably polyethylene, the copolymerisation is preferably carried out with an unsaturated silane compound represented by the formula $$R^1SiR^2{}_qY_{3-q} \qquad (V)$$

wherein
$R^1$ is an ethylenically unsaturated hydrocarbyl, hydrocarbyloxy or (meth)acryloxy hydrocarbyl group,
$R^2$ is an aliphatic saturated hydrocarbyl group,
Y which may be the same or different, is a hydrolysable organic group and
q is 0, 1 or 2.

Special examples of the unsaturated silane compound are those wherein $R^1$ is vinyl, allyl, isopropenyl, butenyl, cyclohexanyl or gamma-(meth)acryloxy propyl; Y is methoxy, ethoxy, formyloxy, acetoxy, propionyloxy or an alkyl- or arylamino group; and $R^2$, if present, is a methyl, ethyl, propyl, decyl or phenyl group.

A preferred unsaturated silane compound is represented by the formula $$CH_2=CHSi(OA)_3 \qquad (VI)$$

wherein A is a hydrocarbyl group having 1-8 carbon atoms, preferably 1-4 carbon atoms.

The most preferred compounds are vinyl trimethoxysilane, vinyl bismethoxyethoxysilane, vinyl triethoxysilane, gamma-(meth)acryloxypropyltrimethoxysilane, gamma (meth)acryloxypropyltriethoxysilane, and vinyl triacetoxysilane.

The copolymerisation of the olefin, e.g. ethylene, and the unsaturated silane compound may be carried out under any suitable conditions resulting in the copolymerisation of the two monomers.

Moreover, the copolymerisation may be implemented in the presence of one or more other comonomers which can be copolymerised with the two monomers. Such comonomers include (a) vinyl carboxylate esters, such as vinyl acetate and vinyl pivalate, (b) alpha-olefins, such as propene, 1-butene, 1-hexane, 1-octene and 4-methyl-1-pentene, (c) (meth)acrylates, such as methyl(meth)acrylate, ethyl(meth)acrylate and butyl(meth)acrylate, (d) olefinically unsaturated carboxylic acids, such as (meth)acrylic acid, maleic acid and fumaric acid, (e) (meth)acrylic acid derivatives, such as (meth)acrylonitrile and (meth)acrylic amide, (f) vinyl ethers, such as vinyl methyl ether and vinyl phenyl ether, and (g) aromatic vinyl compounds, such as styrene and alpha-ethyl styrene.

Amongst these comonomers, vinyl esters of monocarboxylic acids having 1-4 carbon atoms, such as vinyl acetate, and (meth)acrylate of alcohols having 1-4 carbon atoms, such as methyl(meth)-acrylate, are preferred.

Especially preferred comonomers are butyl acrylate, ethyl acrylate and methyl acrylate.

Two or more such olefinically unsaturated compounds may be used in combination. The term "(meth)acrylic acid" is intended to embrace both acrylic acid and methacrylic acid. The comonomer content of the copolymer may amount to 70 wt % of the copolymer, preferably about 0.5 to 35 wt %, most preferably about 1 to 30 wt %.

If using a graft polymer, this may have been produced e.g. by any of the two methods described in U.S. Pat. No. 3,646,155 and U.S. Pat. No. 4,117,195, respectively.

The silane group containing polyolefin (A) preferably contains 0.001 to 15 wt % of the silane compound, more preferably 0.01 to 5 wt %, most preferably 0.1 to 2 wt %.

The polyolefin composition according to the invention when extruded exhibits almost thermoplastic behaviour. This means, inter alia, that the melt flow rate of composition does not significantly drop upon extrusion even at comparatively high temperatures.

Therefore, preferably the polyolefin composition has a $MFR_{21}$ (190° C., 21.6 kg) of 50 g/10 min or more, more preferably 60 g/10 min or more, and most preferably 70 g/10 min or more when extruded at any temperature in the range of from 20 to 240° C.

Furthermore, it is preferred that the $MFR_{21}$ (190° C., 21.6 kg) of the composition when extruded at any temperature in the range of from 140 to 240° C. is 90% or more, more preferably 95% or more, of the $MFR_{21}$ (190° C., 21.6 kg) of the same composition extruded without silanol condensation catalyst.

The polymer composition according to the invention may further contain various additives, such as miscible thermoplastics, antioxidants, further stabilizers, lubricants, fillers, colouring agents and foaming agents.

As antioxidant, preferably a compound, or a mixture of such compounds, is used which is neutral or acidic, must comprise a sterically hindered phenol group or aliphatic sulphur groups. Such compounds are disclosed in EP 1 254 923 to be particularly suitable antioxidants for stabilisation of polyolefins containing hydrolysable silane groups which are crosslinked with a silanol condensation catalyst, in particular an acidic silanol condensation catalyst. Other preferred antioxidants are disclosed in WO2005003199A1.

Preferably, the antioxidant is present in the composition in an amount of from 0.01 to 3 wt %, more preferably 0.05 to 2 wt %, and most preferably 0.08 to 1.5 wt %.

The silanol condensation catalyst usually is added to the silane group containing polyolefin by compounding the polymer with a so-called master batch, in which the catalyst, and optionally further additives are contained in a polymer, e.g. polyolefin, matrix in concentrated form.

The silanol condensation catalyst (B) and the silicon containing compound (C) are preferably added to the silane group containing polyolefin (A) by mixing during extrusion or other melt manufacturing.

Accordingly, the present invention also pertains to a master batch for a crosslinkable polyolefin composition comprising a matrix polymer, a silanol condensation catalyst (B) in any of the above described embodiments, and a silicon containing compound (C) in any of the above described embodiments.

The matrix polymer is preferably a polyolefin, more preferably a polyethylene, which may be a homo- or copolymer of ethylene, e.g. low density polyethylene, or polyethylene-methyl-ethyl-butyl-acrylate copolymer containing 1 to 50 wt % of the acrylate, and mixtures thereof.

As stated, in the master batch the compounds to be added to the silane group containing polyolefin are contained in concentrated form, i.e. in a much higher amount than in the final composition.

The master batch preferably comprises component (B) in an amount of from 0.3 to 6 wt %, more preferably from 0.7 to 3.5 wt %.

Component (C) preferably is present in the master batch in an amount of from 1 to 20 wt %, more preferably from 2 to 10 wt %.

The master batch preferably is processed with the silane group containing polymer in an amount of from 1 to 10 wt %, more preferably from 2 to 8 wt %.

Compounding may be performed by any known compounding process, including extruding the final product with a screw extruder or a kneader.

The present invention furthermore relates to a process for producing an article comprising extrusion of a polyolefin composition in any of the above described embodiments at a temperature in the range of 140 to 280° C.

The invention also relates to an article, preferably a wire or cable, comprising the polyolefin composition in any of the above described embodiments.

Furthermore, the invention relates to the use of the polyolefin composition in any of the above described embodiments for the production of an article, in particular a wire or cable.

Still further, the invention relates to the use of a silicon containing compound (C) in any of the above described embodiments as a processing aid which reduces the retention time of a composition comprising a polyolefin comprising hydrolysable silane groups and a silanol condensation catalyst in the extruder and/or reduces the extrusion temperature in the extrusion of said composition.

The invention also relates to the use of a silicon containing compound (C) in any of the above described embodiments as a surface smoothening agent in a composition comprising a polyolefin comprising hydrolysable silane groups and a silanol condensation catalyst.

In a further aspect, the present invention relates to the use of a silicon containing compound as a drying agent for polyolefin compositions comprising a crosslinkable polyolefin with hydrolysable silane groups.

Polyolefin compositions often comprise several polymeric components, as for example polyolefin resins with different properties, such as different molecular weights, or different content of comonomer. Furthermore, organic and/or inorganic additives such as stabilizers are usually present in a polyolefin composition. The nature and amount of these polyolefin resins and these additives is dependent on the particular use a polyolefin composition is designed for.

Each of the different components a polyolefin composition is made of may comprise small amounts of water. In the step of compounding, the different components come together and the final composition is formed. Also the amounts of water present in the several components are added in the step of compounding.

If water is present in the step of compounding, hydrolysis of silane groups present in the polyolefin resin, and hence crosslinking of the resin, may start. However, crosslinking during compounding e.g. in an extruder is of course undesirable because this may lead to difficulties in the compounding step, e.g. caused by punctual uncontrolled increase in MFR of the composition, and may also negatively affect the properties of the compounded composition.

It is therefore desirable that the components and additives of a polyolefin composition containing crosslinkable groups contain as low water as possible before and during the step of compounding.

It is hence an object of the present invention to provide a drying agent for use in polyolefin compositions which deactivates the water present in the composition.

It has now surprisingly been found that the above object can be achieved by using a silicon containing compound as drying agent for a polyolefin composition.

The present invention therefore provides in a second aspect the use of a silicon containing compound as drying agent for a polyolefin composition containing crosslinkable silane groups, wherein the silicon containing compound has a structure according to the formula $$(R^1)_x[Si(R^2)_y(R^3)_z]_m \quad (I)$$

wherein
R$^1$, which may be the same or different if more than one such group is present, is a monofunctional, or, if m=2, is a bifunctional, hydrocarbyl residue comprising from 1 to 100 carbon atoms and at least one heteroatom;
R$^2$, which may be the same or different if more than one such group is present, is a hydrocarbyloxy residue comprising from 1 to 100 carbon atoms;
R$^3$, is —R$^4$SiR$^1_p$R$^2_q$, wherein
p is 0 to 3,
q is 0 to 3,
with the proviso that p+q is 3, and
R$^4$ is —(CH$_2$)$_r$Y$_s$(CH$_2$)$_t$— where r and t independently are 1 to 3, s is 0 or 1 and Y is a difunctional heteroatomic group selected from —O—, —O—(CO)—, —NH—, —NH$_2$, —NH—(CO)—NH$_2$, —NH—(CO)—OCH$_3$, an epoxy group, a carbamate group, —S—, —SO—, —SO$_2$—, —NR—, —PR—, where R is a hydrocarbon or a hydrogen and where R$^1$ and R$^2$ are as previously defined; and
x is 0 to 3, y is 1 to 4, z is 0 or 1, with the proviso that x+y+z=4;
and m=1 or 2.

The use according to the invention results in an improved behaviour of the polyolefin compositions in the step of compounding because it enables a so-called "self-drying" of the composition.

Preferably the drying agent is used for drying, i.e. removing, of water. The drying agent reacts with the water present in the composition. After addition of the drying agent to the polyolefin composition no measurable free water content exists in the composition.

Compounding of the polyolefin composition preferably is done by extrusion.

It is found that such compositions in the extruder behave very similar to an thermoplastic material upon extrusion, i.e. there is virtually no drop in melt flow rate upon extrusion.

The polyolefin composition for which the above described silicon containing compound is used as a drying agent comprises a crosslinkable polyolefin with hydrolysable silane groups, and preferably further comprises a silanol condensation catalyst.

The silanol condensation catalysts of the polyolefin composition preferably is a Brönsted acid (B), i.e. is a substance which acts as a proton donor.

For the present second aspect of the invention the same preferred embodiments as regards the crosslinkable polyolefin with hydrolysable silane groups (A), the silanol condensation catalyst (B), and the silicon containing compound (C) are applicable as disclosed in connection with the first aspect of the present invention.

In a further aspect, the present invention relates to the use of a silicon containing compound as a corrosion inhibitor in polyolefin compositions comprising a Brönsted acid.

Polyolefin compositions often comprise several polymeric components, as for example polyolefin resins with different properties, such as different molecular weights, or different content of comonomer. Furthermore, organic and/or inorganic additives such as stabilizers are usually present in a polyolefin composition. The nature and amount of these polyolefin resins and these additives is dependent on the particular use a polyolefin composition is designed for.

Depending on the specific type of the polyolefin composition and on its application, the polyolefin composition may comprise a Brönsted acid. This is for example the case in polyolefin compositions which comprise a crosslinkable polyolefin with hydrolysable silane groups and a silanol condensation catalyst which comprises a Brönsted acid, e.g. a sulphonic acid.

The resulting compositions have an acidic behaviour if a Brönsted acid, particularly a strong Brönsted acid as for example a sulphonic acid is present in the composition. The Brönsted acid may be added to the base resin in the step of compounding. In all further steps of the process as well as in the application the polyolefin composition is designed for, the acidic ingredient of the composition may cause unfavourable effects on the environment.

In the step of compounding, the equipment is contacted with the polyolefin composition and the additives. This is also valid for later processing steps, for example an extrusion step for cable production.

Corrosion may also occur where polyolefin compositions containing a Brönsted acid are used as shields of metallic conductors, e.g. in power cables.

In all these situations corrosion of the material which is in contact with the polyolefin composition may occur. This is very unfavourable since the lifetime of the material is shortened.

It is hence an object of the present invention to provide a corrosion inhibitor for use in polyolefin compositions, thereby avoiding corrosion of the material in contact with the polyolefin composition.

Corrosion inhibitors are well known in the art. A corrosion inhibitor is a chemical compound that, when added in small concentration, stops or slows down corrosion of metals or alloys. The favourable effect of the corrosion inhibitor may be achieved due formation of a passivation layer, which stops access of the corrosive substance to the metal, or, alternatively, inhibiting either the oxidation or reduction part of the redox corrosion system. As every oxidation requires a reduction to occur at the same time, the inhibition of one of the two reactions may be sufficient. A further alternative is to remove the oxidant from the redox system. If oxidants such as oxygen are excluded, the rate of the corrosion can be controlled by the rate of water reduction.

It has now surprisingly been found that the above given object can be achieved by using a silicon containing compound as corrosion inhibitor in a polyolefin composition.

The present invention therefore provides in a third aspect the use of a silicon containing compound as corrosion inhibitor in a polyolefin composition comprising a Brönsted acid, wherein the silicon containing compound has a structure according to the formula $$(R^1)_x[Si(R^2)_y(R^3)_z]_m \quad (I)$$

wherein
R$^1$, which may be the same or different if more than one such group is present, is a monofunctional, or, if m=2, is a bifunctional, hydrocarbyl residue comprising from 1 to 100 carbon atoms and at least one heteroatom;

R², which may be the same or different if more than one such group is present, is a hydrocarbyloxy residue comprising from 1 to 100 carbon atoms;

R³, is —R⁴SiR¹$_p$R²$_q$, wherein p is 0 to 3, q is 0 to 3, with the proviso that p+q is 3, and R⁴ is —(CH$_2$)$_r$Y$_s$(CH$_2$)$_t$— where r and t independently are 1 to 3, s is 0 or 1 and Y is a difunctional heteroatomic group selected from —O—, —O—(CO)—, —NH—, —NH$_2$, —NH—(CO)—NH$_2$, —NH—(CO)—OCH$_3$, an epoxy group, a carbamate group, —S—, —SO—, —SO$_2$—, —NR—, —PR—, where R is a hydrocarbon or a hydrogen and where R¹ and R² are as previously defined; and x is 0 to 3, y is 1 to 4, z is 0 or 1, with the proviso that x+y+z=4;

and m=1 or 2.

The use according to the invention results in less corrosion of the material in contact with polyolefin compositions containing a Brönsted acid.

Compounding of the polyolefin composition preferably is done by extrusion.

In a preferred embodiment of the invention, the polyolefin composition in which the above described silicon containing compound is used as a corrosion inhibitor comprises a crosslinkable polyolefin with hydrolysable silane groups. The Brönsted acid present in the composition may then act as a silanol condensation catalyst.

For the present third aspect of the invention the same preferred embodiments as regards the crosslinkable polyolefin with hydrolysable silane groups (A), the silanol condensation catalyst (B), and the silicon containing compound (C) are applicable as disclosed in connection with the first aspect of the present invention.

In a further aspect, the present invention relates to the use of a silicon containing compound as a pH controlling agent in polymer compositions comprising a Brönsted acid.

Polymer compositions often comprise several polymeric components, as for example polymer resins with different properties, such as different molecular weights, or different content of comonomer. Furthermore, organic and/or inorganic additives such as stabilizers are usually present in a polymer composition. The nature and amount of these polymer resins and these additives is dependent on the particular use a polymer composition is designed for.

Depending on the specific type of the polymer composition and on its application, the polymer composition may comprise a Brönsted acid. This is for example the case in polyolefin compositions which comprise a crosslinkable polyolefin with hydrolysable silane groups and a silanol condensation catalyst which comprises a Brönsted acid, e.g. a sulphonic acid.

The resulting compositions have an acidic behaviour if a Brönsted acid, particularly a strong Brönsted acid as for example a sulphonic acid is present in the composition. The acidic ingredient of the composition may cause unfavourable effects on the environment or on other ingredients of the composition.

Hence, other ingredients may be affected in their desired properties and material in contact with the compositions may also be affected.

It is hence an object of the present invention to provide a pH controlling agent for use in polymer compositions, thereby avoiding unfavourable effects on material in contact with the polymer compositions or within the polymer compositions.

In the present application the term "pH controlling agent" denotes a chemical which avoids the change of acidity in the polymer composition if a Brönsted acid or base is added to the polymer composition.

It has now surprisingly been found that the above given object can be achieved by using a silicon containing compound as pH controlling agent in a polymer composition.

The present invention therefore provides in a forth aspect the use of a silicon containing compound as pH controlling agent in a polymer composition comprising a Brönsted acid, wherein the silicon containing compound has a structure according to the formula

$$(R^1)_x[Si(R^2)_y(R^3)_z]_m \quad (I)$$

wherein

R¹, which may be the same or different if more than one such group is present, is a monofunctional, or, if m=2, is a bifunctional, hydrocarbyl residue comprising from 1 to 100 carbon atoms and at least one heteroatom;

R², which may be the same or different if more than one such group is present, is a hydrocarbyloxy residue comprising from 1 to 100 carbon atoms;

R³, is —R⁴SiR¹$_p$R²$_q$, wherein p is 0 to 3, q is 0 to 3, with the proviso that p+q is 3, and R⁴ is —(CH$_2$)$_r$Y$_s$(CH$_2$)$_t$— where r and t independently are 1 to 3, s is 0 or 1 and Y is a difunctional heteroatomic group selected from —O—, —O—(CO)—, —NH—, —NH$_2$, —NH—(CO)—NH$_2$, —NH—(CO)—OCH$_3$, an epoxy group, a carbamate group, —S—, —SO—, —SO$_2$—, —NR—, —PR—, where R is a hydrocarbon or a hydrogen and where R¹ and R² are as previously defined; and x is 0 to 3, y is 1 to 4, z is 0 or 1, with the proviso that x+y+z=4;

and m=1 or 2.

The use according to the invention results in a control of the acidity within the polymer composition and therefore avoids any unfavourable effects on material in contact with the compositions or within the composition.

In a preferred embodiment the polymer composition according to the invention is a polyolefin composition.

In a particular preferred embodiment of the invention, the polyolefin composition in which the above described silicon containing compound is used as a pH controlling agent comprises a crosslinkable polyolefin with hydrolysable silane groups. The Brönsted acid present in the composition may then act as a silanol condensation catalyst.

For the present forth aspect of the invention the same preferred embodiments as regards the crosslinkable polyolefin with hydrolysable silane groups (A), the silanol condensation catalyst (B), and the silicon containing compound (C) are applicable as disclosed in connection with the first aspect of the present invention.

The following examples serve to further illustrate the present invention.

EXAMPLES

1. Compositions Produced

In each of the Examples 1.5 wt % of one of the following silicon containing compounds (C) was mixed by soaking with a crosslinkable polyolefin with hydrolysable silane groups (A) having a density of 935 kg/m³, a MFR$_5$ of 1.5 g/10 min and a content of vinyl trimethoxysilane of 2.0 wt %.

Soaking method used in these preparations:

Pellets of (A) are put in a sealed glass flask and heated in an oven at 50° C. for 1 h. Afterwards 1.5 wt % of the compound (C) is added. The flask is again heated in the oven at 50° C. for 16 h. The flask is shaken regularly in the oven, preferably using a mechanical rotation of the flask.

Example 1

Methacryloxymethyltrimethoxysilane

Example 2

3-Methacryloxypropyltrimethoxysilane

Example 3

3-Glycidoxy-propyltrimethoxysilane

Example 4

3-Ureidopropyltrimethoxysilane

Example 5

N-Trimethoxysilylmethyl-O-methylcarbamate

Comparative Example

No Silicon Containing Compound Added

For the tape surface test each of the resulting resins was dry mixed with 5 wt % of a catalyst masterbatch, containing a sulphonic acid silanol condensation catalyst. The composition of the catalyst masterbatch used for evaluation is:

| | |
|---|---|
| EBA (17 wt % BA), MFR$_2$ = 4 | 91.1 wt % |
| Ionol LC | 6.4 wt % |
| Dodecyl benzene sulphonic acid | 1.5 wt % |
| Licowax E (CAS-no. 73138-45-1) | 1 wt % |

The dry mixing is done by putting the two components in a new clean plastic bag, which is shaken for obtaining a good mix and then the containing mix is fed into a tape extruder.

"EBA" denotes an ethylene butyl acrylate copolymer, "BA" the butyl acrylate part of the copolymer.

Ionol LC (Degussa) denotes butylated reaction products of 4-methyl-phenol with dicyclopentadiene (CAS-no 68610-51-5).

2. Measurement Methods a) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. and may be determined at different loadings such as 2.16 kg (MFR$_2$) or 21.6 kg (MFR$_{21}$).

b) Comonomer Content

Comonomer content (wt %) was determined in a known manner based on Fourier transform infrared spectroscopy (FTIR) determination calibrated with $^{13}$C-NMR. The peak for the comonomer was compared to the peak of polyethylene (e.g. the peak for butyl acrylate at 3450 cm$^{-1}$ was compared to the peak of polyethylene at 2020 cm$^{-1}$ and the peak for silane at 945 cm$^{-1}$ was compared to the peak of polyethylene at 2665 cm$^{-1}$. The calibration with $^{13}$C-NMR is effected in a conventional manner which is well documented in the literature.

c) Tape Surface

The compositions were extruded in a Brabender tape extruder with a tape forming die having a melt temperature of 210° C. for 10 min. A 4:1 compression was used, and the heat was adjusted to 160° C., 180° C. and 210° C. for the different zones of the extruder. Water cooling was used on the feeding zone. The rotation speed was 30 rpm. Extrusion initially took place for 30 min.

The tapes produced were visually inspected and the surface quality was rated according to the amount of gels counted, haziness and irregularities of the tape. In the rating, the numbers mean: 1 is good (the tape has no gels, perfect finish, no irregular shaped edges, thin and transparent look), 3 is acceptable to be used for commercial production (there are a number of small gels, the tape is somewhat hazy but still the edges of the tape is perfect), and above 3 is not acceptable for commercial use (there are significant amount of small gels and or some larger ones >1 mm).

| Example | |
|---|---|
| 1 | 2 |
| 2 | 1 |
| 3 | 3 |
| 4 | 2 |
| 5 | 1 |
| Comparative | 4 |

The invention claimed is:

1. Process for removing water during extrusion of a polyolefin composition, comprising:
   adding a silicon containing compound (C) to the polyolefin composition during extrusion;
   wherein the polyolefin composition comprises a crosslinkable polyolefin with hydrolysable silane groups (A) and a silanol condensation catalyst (B); and
   wherein the silicon containing compound (C) is selected from the group consisting of Ureidopropyltrimethoxysilane, N-Trimethoxysilylmethyl-O-methylcarbamate, and mixtures thereof.

2. A method for removing water from a polyolefin composition during compounding, comprising:
   adding a silicon containing compound (C) to the polyolefin composition during compounding of the polyolefin composition;
   wherein the polyolefin composition comprises a crosslinkable polyolefin with hydrolysable silane groups (A) and a silanol condensation catalyst (B);
   wherein the silicon containing compound (C) is selected from the group consisting of 3-Ureidopropyltrimethoxysilane, N-Trimethoxysilylmethyl-O-methylcarbamate, and mixtures thereof; and
   wherein the silanol condensation catalyst (B) is an organic sulphonic acid comprising the structural element:

$$Ar(SO_3H)_x \qquad (II)$$

with Ar being an aryl group substituted with at least one C$_4$- to C$_{30}$-hydrocarbyl group and the total silanol condensation catalyst (B) comprises from 10 to 200 C-atoms and x being at least 1; and wherein the silicon containing compound (C) is a drying agent and water is removed during compounding.

3. The method of claim 2, wherein the crosslinkable polyolefin with hydrolysable silane groups (A) comprises a polyethylene with hydrolysable silane groups.

* * * * *

UNITED STATES PATENT AND TRADEMARK OFFICE
CERTIFICATE OF CORRECTION

PATENT NO. : 8,529,815 B2  Page 1 of 1
APPLICATION NO. : 12/745612
DATED : September 10, 2013
INVENTOR(S) : Roger Carlsson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 309 days.

Signed and Sealed this

Fifteenth Day of September, 2015

Michelle K. Lee
*Director of the United States Patent and Trademark Office*